3,220,994
LIQUID POLYMERS OF TURPENTINE
Arthur R. Clark and Margaret M. Clark, Sylvania, Ohio, assignors to National Rosin Oil Products, Inc., Savannah, Ga., a corporation of Georgia
No Drawing. Filed May 24, 1961, Ser. No. 112,179
7 Claims. (Cl. 260—93.3)

This invention relates to a polymer product and method, and, more particularly, to a product which results from the reaction of turpentine in the presence of boron trifluoride or the like and to a method for producing such product.

The instant invention is based upon the discovery that turpentine, when subjected to the action of boron trifluoride, undergoes an exothermic reaction which, if appropriately controlled, results in a product which may involve as many as three phases: black, red and yellow, but from which a homogeneous, buttery, and unexpectedly useful polymeric composition can be recovered in high yield. The composition is stable at elevated temperatures, is lubricous over an unexpectedly broad range of temperatures, and is capable of forming stable emulsions of the water in oil and of the oil in water type. As a consequence, the composition is unexpectedly useful in each of a large number of fields, as will subsequently be discussed in more detail.

The invention will be more fully understood from the following description of the best presently known mode for producing the polymeric composition.

*Example 1*

A three neck flask was charged with 800 grams of gum turpentine and 500 grams of ethyl acetate. One neck of the flask was fitted with a gas inlet which extended below the level of turpentine and ethyl acetate. A second neck was equipped with a stirrer, while the third neck carried a thermometer and had a side arm which extended to a vertical leg carrying a second thermometer and a downwardly inclined side leg which constituted an air condenser providing a passage to a water cooled condenser, below which was provided a receiver. After the turpentine and ethyl acetate had been charged into the flask, anhydrous boron trifluoride gas was bubbled into the agitated solution through the gas inlet until the first thermometer, which extended below the liquid level in the flask, indicated a liquid temperature of 50° C. At this time the $BF_3$ added amounted to 5 grams. The introduction of boron trifluoride was then discontinued, and mechanical agitation was provided by means of the stirrer, and was continued until the composition within the flask boiled sufficiently strongly to assure homogeneity. It should be noted that no external heat was supplied to the reaction mixture above that provided by ordinary ambient conditions of 20 to 25° C., and that all of the reactants were charged after storage under ordinary ambient conditions, and at temperatures of from about 20 to about 25° C. The temperature increase within the flask was the consequence of exothermic reaction; such reaction continued after the introduction of boron trifluoride was discontinued, and caused a progressive temperature increase to about 145° C. As the temperature rose, ethyl acetate was vaporized and, after the flask had been heated sufficiently by the vaporized ethyl acetate, began to condense in the air condenser and in the water condenser, and to collect in the receiver. When the reaction mixture reached a temperature of 147° C., substantially all of the ethyl acetate had been distilled from the flask and collected in the receiver. The temperature of the reaction product, which remained in the flask, then began to decrease, and continued to decrease until it reached room temperature. The contents of the flask were then poured into 4500 parts of a 1 percent ammonium hydroxide solution, and the resulting mixture was agitated sufficiently violently to cause homogeneity. The water-polymer composition was then allowed to stand a short time until there were two separate phases, with the polymer phase at the top, and the water phase, including dissolved ammonium fluoride and other salts, at the bottom. The rapid separation of the two phases is attributed to a salting out phenomenon. The water phase was then drawn off, and the polymer phase was charged to an open vessel and heated to drive off water and other volatile components. When the liquid polymer in the vessel reached 175° C., a sample thereof was taken, and is herein for convenience designated "Composition A." When the liquid polymer reached a temperature of 190° C., a second sample was taken, and is herein designated "Composition B." A third sample, taken when the liquid reached a temperature of 200° C., is designated "Composition C." The total yield of useful polymer amounted to 715 parts, a yield of between 89 and 90 percent, based upon the total of gum turpentine charged.

Composition B was a light yellow to light tan liquid having a viscosity of 178.5 centistokes, a required HLB [1] of from 7 to 15, an alkalinity of 0.080 percent and an ash content of 0.00 percent. It has been found to be stable for extended periods of time at temperatures as high as 370° C. in a closed system. At temperatures as high as about 370° C., in an open system, volatilization of low boiling constituents continues, and causes a progressive increase in viscosity. At temperatures in the range of 450 to 600° C., in contact with air, Composition B burns cleanly, without forming hard carbon. The material has a strong tendency to remain in a semi-tacky or buttery condition, drying to a tack-free condition only when in a thin film, and only when forced. It is compatible with most waxes and oils, and incompatible with cellulose acetate, and ethyl cellulose. It is insoluble in methyl alcohol, ethyl alcohol and water, and soluble in most aromatic and aliphatic solvents. It undergoes no apparent reaction with or in the presence of metal organic compounds such as tin octoate and organic peroxides such as benzoyl peroxide. Composition A and Composition C were similar to Composition B, having the same general properties except for viscosity, which was 100 centistokes, and $Z_1$ and $Z_2$, Gardner tube (bubble), respectively.

Various solutions and emulsions which were unexpectedly useful have been prepared from Compositions A, B and C. In some cases, the unexpected utility depends upon the similarity of the compositions to lanolin. As a consequence of the similarity, any of the compositions can be substituted for lanolin in known formulations. Specifically, Composition A, Composition B or Composition C can be substituted for the lanolin of any of the formulations set forth in "A Guide to Cosmetic and Pharmaceutical Formulation With Atlas Products," a publication of Atlas Powder Company, Wilmington 99, Delaware, copyright 1953 and 1954. The required HLB of these compositions is substantially the same as that of lanolin, so that mere substitution in any of the formulations which utilizes lanolin is possible wthout even the necessity for adjustment of the surfactant or surfactant composition. Such compositions are hand lotions, hair lotions, deodorants, cream rouges and the like. The

---

[1] HLB, or hydrophile-lipophile balance, of a surfactant is a measure of the balance between the hydrophilic and the hydrophobic or lipophilic portions of its molecule (see Griffin, W. C., Classification of Surface Active Agents by "HLB," Journal of the Society of Cosmetic Chemists, 1, 5, 311–326 (1949)). The "required" HLB of a material is the balance necessary for effective emulsification.

physical properties such as shortness and body of the compositions are also important for cosmetic uses. If lanolin is used for its emollient properties it is necessary also to add wax and mineral oil to achieve comparable physical properties. Compositions A, B and C are emollient and have these properties inherently, and are preferable because they do not separate. Compositions A, B and C are also useful as perfume additives where as little as 0.001 percent [2] is unexpectedly advantageous for retarding the rate of volatilization of the essence.

Various emulsions have also been prepared directly from Composition A, Composition B and Composition C and surface active agents. In all cases the emulsions were prepared by heating a mixture of Composition A, B or C with a surface active agent or agent composition to 70° C., adding distilled water at 72° C. to the mixture, with agitation, and then allowing the composition to cool to ambient conditions. The compositions, in parts by weight, of representative emulsions that have been so prepared are given in the following table:

|  | Emulsion 1 | Emulsion 2 | Emulsion 3 | Emulsion 4 | Emulsion 5 | Emulsion 6 |
|---|---|---|---|---|---|---|
| Composition A, B or C | 5 | 5 | 10 | 10 | 10 | 10 |
| Polyoxyethylene Oleyl Alcohol | 10 | | | | | |
| Polyoxyethylene Cetyl Alcohol | | 10 | | | | |
| Sorbitan monostearate | | | 2.5 | 2.5 | | |
| Polyoxyethylene sorbitan trioleate | | | 2.5 | | | 2.5 |
| Polyoxyethylene sorbitan monopalmitate | | | | 2.5 | 2.5 | |
| Sorbitan monolaurate | | | | | 2.5 | |
| Polyoxyethylene stearate | | | | | | 2.5 |
| Water | 85 | 85 | 85 | 85 | 85 | 85 |
| HLB of surfactant or surfactant composition | | | 8 | 10 | 12 | 14 |

The procedure set forth in the foregoing example involved the use of gum turpentine as a starting material. Gum turpentine is separated by distillation from gum thus, a natural product which is recovered from pine trees in many Southern States of the United States. Gum turpentine is a preferred starting material for use in accordance with the instant invention because optimum yields have been achieved therewith, and particularly with aged gum turpentine and artificially aged (as by bubbling air or oxygen therethrough) gum turpentine. It is entirely feasible, however, to use other turpentines, turpentine-containing compositions and turpentine fractions as the starting material. For example, gum thus itself has been used satisfactorily, and may be a preferred starting material where it is desired to produce modified rosins. Turpentine obtained by steam distillation of wood stumps is also a suitable starting material, although, to date, somewhat lower yields have been achieved than with gum turpentine. Turpentine obtained from the paper pulp industry, or mixtures thereof with tall oil, before separation, can similarly be used, as can turpentine fractions which remain after recovery of specific fractions, for example specific pinenes, or specific pinene cuts. Any of the recognized types of turpentine is suitable, including Aleppo-, Bordeaux-, Canada-, Carpathian-, common-, Hungarian-, larch-, Strassburg-, and Venice-turpentines.

In addition to the gaseous boron trifluoride which was used in the foregoing example, various other forms of the material can be employed. For example, the dihydrate is suitable, as are complexes with nitrogenous compounds, with oxygen-containing compounds, with ether, with monoethylamine and with phenol. In addition, boron trichloride can be employed, either in the gaseous phase which is its normal state under ambient conditions, or as a complex of any of the above-mentioned types. In general, only a catalytic amount of boron fluoride or chloride is required to initiate the desired reaction. Under most conditions the amount of $BF_3$ should be from about 0.01 percent to about 5 percent of the turpentine charge, although higher percentages can be used if great care is employed to control the course of the reaction, and even lower percentages will initiate reaction. In extreme cases, as little as about 0.001 percent can be used if some heat is supplied to facilitate the reaction, and as much as about 10 percent can be employed if extreme care is used in control of the reaction. When boron chloride or a complex is used as the catalyst, as discussed above, the amount thereof required for causing the reaction to proceed in a particular manner is the amount which contains the same quantity of boron as the amount of $BF_3$ necessary to achieve that result.

It will be appreciated that ethyl acetate was used in the foregoing example as a convenient means for controlling the reaction. Not only was the ethyl acetate effective in the early stages of the reaction as a diluent, but also its distillation, as described, accomplished considerable cooling and thereby removed heat as the reaction proceeded, thereby effectively controlling reaction rate. Although ethyl acetate is the most effective solvent for this purpose that has thus far been found, it has been ascertained that any solvent which is compatible with turpentine, whether water miscible or immiscible, can be employed in place thereof with a greater or lesser degree of desirability. In addition, by using considerable care, the reaction can be conducted without the use of any solvent. For example, turpentine can be charged into a suitable vessel provided with extensive cooling surface, for example having numerous finned tubes provided therein, and preferably also water-jacketed, and reaction can then be initiated as described above by bubbling $BF_3$ gas or $BCl_3$ gas, or by dripping a boron trifluoride or boron trichloride complex therein until a significant temperature rise occurs, by virtue of exothermic reaction. By circulating a heat transfer fluid such as chilled water or a refrigerant through the finned tubes or the like, and through the jacket, if used, at a sufficiently high rate, the reaction can be controlled, and can be caused to proceed to the required extent. With inadequate cooling, using such a technique, charring occurs, with the result that only a substantially useless mass is produced. In general, the cooling should be sufficient that the exothermic heat of reaction does not cause a temperature rise to one above about 200° C., but should be restrained to such an extent that the exotherm causes a temperature rise to at least about 100° C. Preferably, the temperature is controlled so that the maximum reaction temperature is from about 125° C. to about 175° C., and, most desirably, the maximum reaction temperature is from about 135° C. to about 165° C.

The final washing step which was described above is important, because the elimination of the boron catalyst is highly desirable, if not essential, for most uses to which the polymeric material according to the invention can be put. The washing operation not only eliminates the boron catalyst, but also neutralizes any acidity, for example that which might be occasioned by decomposition of the catalyst. In addition, the reaction product is changed from a tacky resinous nature to a semi-tacky or buttery condition.

The composition according to the instant invention has unique properties which make it highly attractive for many and varied uses. It is lubricous in nature and is capable of withstanding relatively high temperatures. It also retains its lubricity at high temperatures. In addition, it is effective as a bodying agent because of its high

---

[2] The terms "percent" and "parts" are used herein, and in the appended claims, to refer to percent and parts by weight, unless otherwise indicated.

viscosity, but its viscosity is stable and, unlike most bodying agents, it does not harden upon standing. In fact, it is inert with respect to free radical catalysts such as various metal organic complexes, benzoyl peroxide, hydrogen peroxide, ozonides, azo compounds and the like and can be used as an anti-skinning agent even in compositions which include such free radical catalysts.

The composition according to the invention is useful as an anti-skinning agent with castor and other oxidizable oils, for which use it is most desirably employed either as a solution in the oil, or as a solution in an organic solvent, which solution is then mixed with the oil. In addition, as either an emulsion or a solvent solution, the composition is useful as an anti-skinning agent in adhesives and coating compositions, inks, and compositions used for decorative purposes where it modifies the tack characteristics prior to cure or hardening, extending the working life, and where it also increases the flexibility of the cured or hardened product. This latter characteristic is particularly important with bone, casein, fish and some resin glues. The composition can also be used, and again in either a solvent solution or as an emulsion, whichever may be applicable with the particular system, to extend the setting or hardening of various waxes, putties, paints, asphalts and bitumens, shoe polishes and liquid resins. In printing inks, the retardation of tackification is particularly important, as it enables, particularly where infra-red or other heaters are used to facilitate drying, the use of an ink which does not tack during use on high speed rolls or upon standing even for extended periods of time under ambient conditions. This enables the formulation of inks which do not need to be removed from press rolls during a short period of shutdown, but which can merely be allowed to stand until it is desired to resume press operation. Although a composition which seems to be buttery in texture can be prepared from dibutyl phthalate or other plasticizers and resins, such material tends to tackify and string on high speed rolls, probably because of a chromatographic phenomenon caused by the rolls, or because of plasticizer absorption by paper being printed, and is, therefore unsatisfactory.

The composition of the instant invention is also significantly useful for numerous applications where its lubricity is an important factor. For example, because of its temperature resistance it is useful as a high temperature lubricant in rockets, on metal rolls, nylon dies, in glass fiber forming operations and in powder metallurgy. Particularly significant in the powder metallurgical field is the use of the composition as a lubricant which can be sprayed directly onto a mold or die. The composition is also important in the oilless bearing field, where metal powder is pressed to a desired shape, fired, subjected to vacuum, and then dipped into a lubricant. There is a considerable need for a lubricant for use in oilless bearings which will withstand 600° F. for 1000 hours. Preliminary test results indicate that the instant composition is significantly superior to previously known lubricants for this use, and probably will withstand the 600° F. for 1000 hours. The composition is also useful for its lubricous properties for softening leather, where it could be used with neat's-foot oil, if desired, and also with other oils in leather finishing. When mixed with an investment mold composition, or sprayed onto a pattern that is to be reproduced, it is useful as a lubricant in connection with investment casting. Similarly, when mixed with a synthetic resinous molding composition, or sprayed into a mold cavity, it is useful as a lubricant with resinous molding compositions. In all of the uses discussed in this paragraph, where the lubricous nature of the composition of the instant invention is important, either organic solvent solutions or emulsions thereof can be employed as may be appropriate for the particular application.

The composition of the invention is also useful as a heat transfer fluid, being usable in a closed system either per se or in solution in a suitable organic solvent. For this use, its excellent stability at elevated temperatures is extremely important. It is also useful as a hydraulic fluid at various temperatures within a relatively broad range. The material can also be used in the paper industry as a beater additive to control the physical properties of the beater composition, in the ceramic field as an additive to a raw material batch or to colors to be used on ceramics, in the manufacture of linoleum as a bodying agent, as a laminating resin additive, as a plasticizer and modifier for vinyl plastisols and organosols, as a latex paint fortifier for modifying extrusion and laminating compositions, as a leveling agent, as a fininshing agent, as a detackifier, as a de-gummer, for example, on natural silk, for de-lustering glass fibers, in clay treatment, e.g. mixed with the clay or used as a filler or for catalysis. It can also be used, preferably as a water soluble emulsion, as a non-drying, dust-catching adhesive on glass fiber or other filters which can then be easily cleaned for re-use. It is also useful as a pre-shave lotion for electric shaving and as an additive for after-shave lotion. It can be used in the glass industry for spraying ware in the low temperature end of annealing lehrs to give the ware in process lubricity and to prevent scratching. Because of its non-drying characteristics it is also useful as an additive for sweeping compounds. In addition, an emulsion thereof can be packaged in a pressurized vessel for use in trapping insects. The material can be sprayed onto trees to provide a continuous band that will trap ants, and prevent their climbing above the ring. A similar composition can be used for trapping mosquitos, preferably with a known oil similar to a body oil to attract mosquitos to the trap. The composition is also useful for application to glass molds, acting as a coolant when molten glass comes into contact therewith.

It will be apparent that various changes and modifications can be made from the specific details set forth herein without departing from the spirit and scope of the invention as defined in the appended claims.

What we claim is:

1. A method of preparing liquid polymers of turpentine in high yields which comprises polymerizing the turpentine in the presence of an organic solvent-coolant and an effective amount of a catalyst at a temperature ranging from about 125° C. to 175° C. until the exothermic reaction ceases; said solvent-coolant having a boiling point below 175° C. and being present in an amount sufficient to help maintain the polymerization temperature in the stated range; said catalyst being selected from the group consisting of boron trifluoride, boron trichloride and complexes of said catalyst.

2. A method of preparing liquid polymers of turpentine in high yields which comprises polymerizing the turpentine in the presence of ethyl acetate and an effective amount of a catalyst at a temperature ranging from about 125° C. to 175° C. until the exothermic reaction ceases, said catalyst being selected from the group consisting of boron trifluoride, boron trichloride and complexes of said catalyst.

3. The method of claim 2 further characterized in that the catalyst is present in an amount ranging from 0.001 to 10% by weight of the turpentine.

4. The method of claim 2 further characterized in that the polymerization of the turpentine takes place at a temperature ranging from about 135–165° C.

5. The method of claim 4 further characterized in that the catalyst is present in an amount ranging from about 0.001 to 10% by weight of the turpentine.

6. The process of claim 2 further characterized in that the turpentine is gum turpentine.

7. The liquid polymers of turpentine obtained by the process of claim 1.

(References on following page)

References Cited by the Examiner

UNITED STATES PATENTS

| | | | |
|---|---|---|---|
| 2,368,767 | 2/1945 | Moore | 260—93.3 |
| 2,368,782 | 2/1945 | Rummelsburg | 260—93.3 |
| 2,370,689 | 3/1945 | Rummelsburg | 260—675.5 |
| 2,391,293 | 12/1945 | Carmody | 260—93.3 |
| 2,405,558 | 8/1946 | Borglin | 260—93.3 |
| 2,814,610 | 11/1957 | Braidwood et al. | 260—93.3 |
| 3,127,418 | 3/1964 | Kuester | 260—348 |

OTHER REFERENCES

Roberts et al.: Journal of the American Chemical Society, vol. 72, pp. 1226–1230 (1950).

LEON J. BERCOVITZ, *Primary Examiner.*

MILTON STERMAN, *Examiner.*